E. J. BLOOM.
WATER CLOSET BOWL.
APPLICATION FILED DEC. 19, 1910.

1,008,112.

Patented Nov. 7, 1911.

Witnesses
O. B. Baenziger.
V. C. Spratt.

Inventor
Edgar J. Bloom
By Parker & Burton
Attorneys

COLUMBIA PLANOGRAPH CO., WASHINGTON, D. C.

UNITED STATES PATENT OFFICE.

EDGAR J. BLOOM, OF TIFFIN, OHIO.

WATER-CLOSET BOWL.

1,008,112. Specification of Letters Patent. Patented Nov. 7, 1911.

Application filed December 19, 1910. Serial No. 597,989.

*To all whom it may concern:*

Be it known that I, EDGAR J. BLOOM, a citizen of the United States, residing at Tiffin, county of Seneca, State of Ohio, have invented a certain new and useful Improvement in Water-Closet Bowls, and declare the following to be a full, clear, and exact description of the same, such as will enable others skilled in the art to which it pertains to make and use the same, reference being had to the accompanying drawings, which form a part of this specification.

This invention relates to water closet construction.

It has for its object an improved bowl construction for water closets by means of which the ventilating horn, made as a separate piece from the earthenware bowl, may be attached properly for the purpose of connecting the bowl with the ventilating pipe.

The improvement is to use a bowl that is shorter in construction and lower in height and therefore more economically made in the first instance and more economically burned in the kiln, and which enables me to use with a staple bowl different lengths and shapes of ventilating attachment, whereby the work of the plumber in making the bowl ready for use is rendered easy and can be more cheaply done.

Another feature of advantage is that with the separable fixture in this invention the earthen bowl is less liable to break, both in construction and shipment, inasmuch as the fixture when made as a unitary piece with the bowl is so located with respect to the main part of the bowl as to be especially liable to breakage and injury.

Another feature of advantage, is that with this separable construction, if through settling of building, abuse or other conditions the ventilating horn or bowl should break, the broken part may be separately replaced.

Figure 1:
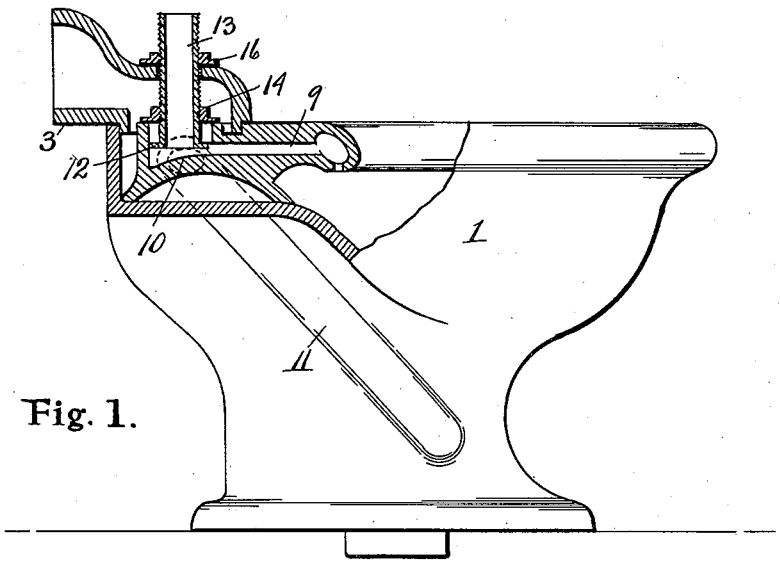
Figure 2:
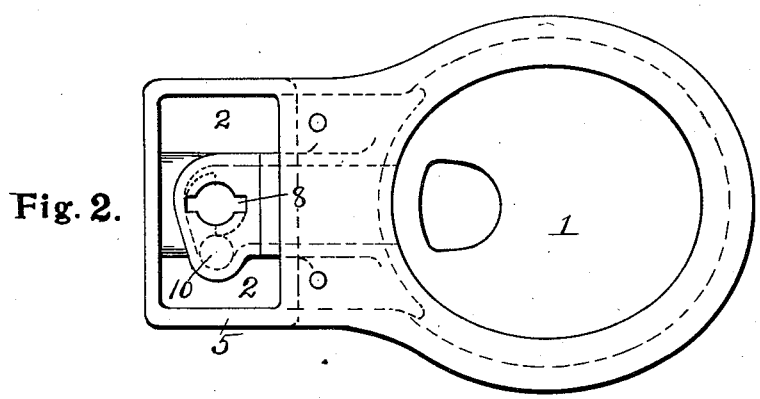
Figure 3:
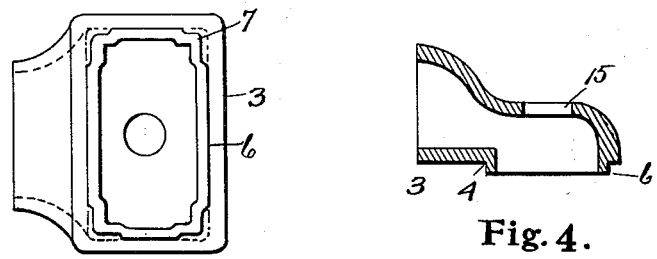
Figure 4:
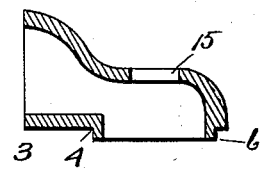

In the drawings:—Figure 1, is a side elevation partly in section showing the bowl with the detachable vent horn in place thereon. Fig. 2, is a plan view of such bowl with the detachable vent horn removed. Fig. 3, is a bottom view of the detachable vent horn. Fig. 4, is a longitudinal vertical section of the detachable vent horn.

The bowl 1, may be of any approved form or shape, only provided that at the rear there is an opening 2 surrounding the entrance end of the water conduit of the bowl, and communicating with the air space in the bowl. The opening 2 extends across from side to side of the bowl and is provided with a seating rim which entirely surrounds the opening and is adapted to receive the seating face of the attachment 3, sometimes called the horn, which is generally an earthenware structure with a seat 4 adapted to engage on the seating flange 5 of the bowl, and with a short neck projection 6 projecting into the opening 2. The outlet end of the horn 3 is brought to any suitable shape, preferably to substantially circular shape. The neck 6 conforms to the general outline of the seating face 2, but preferably at the corners 7 is drawn in somewhat so that there may be an assurance of clearance between the neck and the opening 2 which will compensate for any irregularity in manufacture or of warping in the burning of the bowl. The bowl is provided with a water conduit 8, the mouth of which opens from the opening 2 and which is provided with discharge openings 9 to the flush rim and a discharge opening 10 to the jet conduit 11. The mouth opening 8 is a key-hole opening adapted to receive the irregularly outlined end 12 of a spud 13 which preferably forms part of the water conduit and which is inserted through the key-hole opening 8 and turned to prevent its escape, and is then held in place with respect to the bowl by a running nut 14 which engages over the surface surrounding the mouth of the opening 8, the nut 14 closing the annular chamber which surrounds the spud and lies between the spud and the mouth of the opening and covers the key-hole extensions of the opening 8. The closing here should be measurably tight, but is not necessarily accurately water tight. The spud 14 passes through the hole 15 in the horn 3 and serves to hold the horn to the bowl by means of the running nut 16 which runs on to the spud over the external face of the horn at the opening 15. Here again the opening should be closed with comparative accuracy, but need not be absolutely water tight as any seepage or leakage through the pipe at the opening 14 can simply run into the bowl through the air passages leading out therefrom. The utilizing of the spud 13 as a part of the water pipe is not an essential feature, but it is a desirable feature with vertical inlet pipe bowls. So far, however, as the effect of bolting the several parts herein described together, the spud 13 might be a solid bolt instead of a hollow spud and with rear inlet bowls a solid spud would be preferable.

What I claim is:—

1. In combination with a water closet bowl, provided with a seat having a circular opening with key apertures and with air passages at each side of said circular opening, a detachable vent horn having a bolt opening and adapted to engage on said seat, a spud having an irregularly outlined end passing through said bolt opening and through said seat opening, the irregularly outlined end adapted to pass through the said key apertures and be turned, and thereby lock the spud to the bowl, the spud adapted to act as a water conduit, and running nuts adapted to engage the said spud and secure said vent horn to the seat, substantially as described.

2. The combination of a water closet bowl, having a vent horn seat provided with a central water passage and an air passage at the side thereof, said seat having a groove on the side toward the bowl, a detachable vent horn having a short neck projection adapted to engage on said seat, a spud adapted to pass through said vent horn and engage in the water passage in said seat, a running nut adapted to secure said horn to the seat, and a running nut adapted to hold the spud to the seat, substantially as described.

3. The combination of a water closet bowl, provided with a vent horn seat, having passages for air and for water, a vent horn provided with an opening for the passage of the water pipe therethrough, and with inlet and outlet passages for air, said vent horn having a short neck projection with drawn-in corners, adapted to fit in said seat, a spud adapted to act as a water conduit passed through said vent horn and seat into the water passage, and running nuts adapted to secure said spud to said vent horn and said seat, substantially as described.

4. A water closet bowl, having a vent horn seat provided with a keyhole opening for a water connection and with a side passage for air, a vent horn adapted to fit on said seat and provided with an opening at its top, a threaded water pipe passing through said opening in the horn and the keyhole opening in said seat, the said water pipe provided with an irregularly outlined end adapted to pass through the said keyhole opening and be turned, and running nuts adapted to engage on said threaded water pipe and screw the same to the vent horn and seat, substantially as described.

In testimony whereof, I sign this specification in the presence of two witnesses.

EDGAR J. BLOOM.

Witnesses:
 CHARLES F. BURTON,
 VIRGINIA C. SPRATT.

---

Copies of this patent may be obtained for five cents each, by addressing the "Commissioner of Patents. Washington, D. C."